March 6, 1934. A. F. PFINGSTEN 1,949,759
BREAD BOX
Filed July 22, 1932
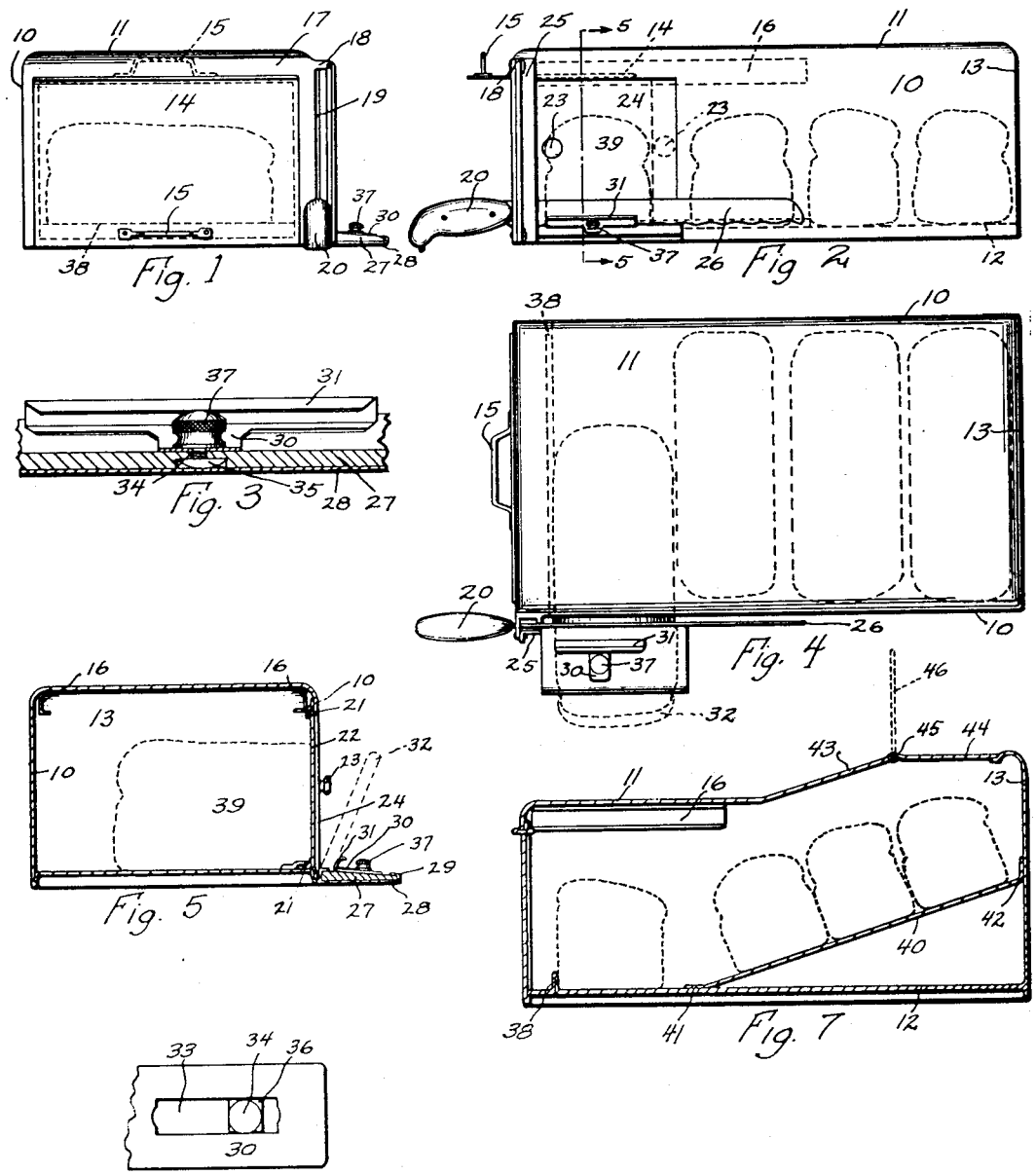

Patented Mar. 6, 1934

1,949,759

UNITED STATES PATENT OFFICE 1,949,759

BREAD BOX

August F. Pfingsten, Rock Rapids, Iowa

Application July 22, 1932, Serial No. 624,000

3 Claims. (Cl. 146—150)

My invention relates to a bread box having a general object to contain loaves of bread and means for slicing the bread attached to the bread box, and is an improved form of that type of bread box incorporated in my application, Serial Number 509,005, filed January 15, 1931 and allowed February 12, 1932.

An object of my invention is to provide a comparatively tight bread box which will contain loaves of bread without rapid drying of the same.

A further object of my invention is to provide a bread box with a side attached device for slicing off loaves of bread without the necessity of removing the loaves from the box.

Another object of my invention is to provide means for adjusting the thickness of the slice of the bread cut from the loaves so that any thickness can be cut.

A further object of my invention is to provide means for making the loaves easily accessible through a front entrance to the box, which includes a conveniently opened door.

A further object of my invention is to provide a chute attachment to the box, which can be made of any length so that a great number of loaves of bread can be placed on this chute where they will slide down the incline by gravity.

A further object of my invention is to accomplish the above mentioned objects in a construction of simplest form, which can be easily manufactured.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a front view of the box,

Figure 2 is a side elevation of the same,

Figure 3 is an enlarged detail view of part of the adjusting device,

Figure 4 is a plan view of the box,

Figure 5 is a sectional view taken generally along the line 5—5 of Figure 2,

Figure 6 is a plan view of part of the adjusting device, and

Figure 7 is a longitudinal sectional view of the modified form of my device, which contains the chute.

I have used the reference character 10 to designate the box sides, and the character 11 designates the box cover.

The box also includes the recessed bottom 12. The rear end of the box is closed by means of the vertical wall 13.

At the front of the box I provide the door 14, which is opened by means of the attached handle 15. This door is opened by means of this handle 15 and is first swung to a horizontal position and then pushed inwardly through the channels 16, which are attached on the inner upper corners of the box. (See Figure 5.)

The front wall of the box 17 includes an extension 18, which extension includes the vertical slot 19. The vertical slot 19 is adapted to receive any type of bread knife 20.

Inside the box and attached to one of the side walls 10, I provide the guides 21, into which is fitted the sliding door panel 22. The panel 22 includes the wooden handle 23.

The wall 10 also includes an opening 24, which will be open to the end of the loaf of bread when the door 22 is pushed rearwardly.

Adjacent the slot 19 is the angle member 25, which is made of enough length to allow the knife blade 26 to pass in a vertical plane without too much free play, so that uniform cuts can be made on the slices.

The slices are cut on the wooden extension 27, which is held in place by the metal extension 28, which includes the overlapping flange 29. I make this piece of wood or other such material preferably so that when the bread is sliced, the knife will not be dulled when it passes through the lower-most portions of the slice.

For adjusting the thickness of the slices to be cut, I provide the adjusting member 30. This member 30 includes the extension 31, which is bent backwardly, as shown.

The reason for bending this extension in this form is to allow the slices to drop over, as shown in the dotted position at 32 in Figure 5, so they will then drop over by gravity and fall on the table.

The member 30 includes the rectangular slot 33, which is engaged by the threaded bolt 34. The threaded bolt 34 is driven into the wood member and includes the round head 35.

The bolt 34 also includes the square upwardly extending section 36, and which receives the slot 33. This portion is made square so that the adjusting member 30 will not tend to pivot about the bolt.

It will be seen from this construction that by pushing the member 30 either towards or away from the box and then tightening the thumb screw 37 after the desired adjustment is made, that various thicknesses of slices can be made.

For retaining the loaves of bread against the forward end of the box, I provide the raised flange 38, which is bent upwardly from the bottom of the box.

The box will usually hold between three and four loaves of bread.

In operation, first the door 22 is pushed rearwardly through the slides 21 by means of the handle 23. The foremost loaf of bread 39 is then brought forwardly against the flange 38, and is then pushed outwardly through the opening 24 and against the flange 31 on the adjusting device.

The blade 26 of the knife is then inserted into the slot 19, and the slices are cut and as each slice is cut, the bread is forced against the flange 31. In this way the desired thickness will be obtained of the slices, and the slices will naturally fall over, as shown.

It will be understood of course that any bread knife can be used with my device or the knife can be attached to the device, when sold.

A further modification of my type of bread box is illustrated in Figure 7. The same principles are applied generally with the exception that the box is made with an inclined chute member 40, which is secured at 41 and 42 to the inside of the box.

In this particular case, the box includes an inclined top portion 43 and a door at 44, which is hinged at 45 to the box, and which when in an open position will be approximately as shown in the dotted lines at 46.

This door is provided to allow insertion of fresh loaves of bread. Although only three loaves are shown on the chute in Figure 7, it will be understood that this chute can be made of any desired length to hold as many loaves of bread as necessary. For instance in a restaurant where this device would be applicable, a great many loaves of bread could be placed inside this container.

When each loaf of bread is cut, it will be brought forward against the flange 38, as described, and the inclination of the chute 40 will allow each succeeding loaf to slide down approximately to the horizontal portion of the box by virtue of gravity, and the weight of the loaf behind it.

It will be seen that I have provided a bread box, which is of tight construction and which will permit the slicing of the bread without removing the loaves from the box.

It will also be seen that I have provided a convenient means for forming the slices of any desired thickness.

It will also be seen that I have provided an incorporated chute device in such bread boxes, which will allow the insertion of a great many loaves, which will automatically feed down to their working position by gravity.

It will be seen further that I have provided all of these features in a box simple to construct and of reasonable cost to manufacture.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A bread box comprising a container including an open end, a door pivotally mounted on the open end, means for guiding the door into horizontal position when opened, said container having an opening adjacent the open end and the door, a flange having a vertical slot adapted to receive a bread cutting knife attached to a corner of the container adjacent said opening, means for adjusting sliced thicknesses of bread, including a bent-over flange having a rectangular slot, a base member attached to the container adjacent said opening including a bolt received within the slot, means for tightening the bolt against the flange to allow a desired thickness of bread to be cut.

2. A bread box comprising a container including an open end, a door pivotally mounted on the open end, means for guiding the door into horizontal position when opened, said container having an opening adjacent the open end and the door, a flange, having a vertical slot adapted to receive a bread cutting knife attached to a corner of the container adjacent said opening, means for adjusting sliced thicknesses of bread, including a bent-over flange having a rectangular slot, a base member attached to the container adjacent said opening including a bolt received within the slot, means for tightening the bolt against the flange to allow a desired thickness of bread to be cut, said container including an inclined member for holding several loaves of bread.

3. A bread box comprising a container including an open end, a door pivotally mounted on the open end, means for guiding the door into horizontal position when opened, said container having an opening adjacent the open end and the door, a flange, having a vertical slot adapted to receive a bread cutting knife attached to a corner of the container adjacent said opening, means for adjusting sliced thicknesses of bread, including a bent-over flange having a rectangular slot, a base member attached to the container adjacent said opening including a bolt received within the slot, means for tightening the bolt against the flange to allow a desired thickness of bread to be cut, the bottom of said container including a raised flange positioned transversely of the bread box and adapted to hold a loaf of bread along its length.

AUGUST F. PFINGSTEN.